United States Patent [19]

Brotz et al.

[11] Patent Number: 5,714,525
[45] Date of Patent: *Feb. 3, 1998

[54] PREPARATION OF FRICTION ELEMENTS AND COMPOSITIONS THEREFOR

[75] Inventors: Ralph T. Brotz, Kohler; Paschal A. Sciarra, Jr.; Phillip A. Waitkus, both of Sheboygan, all of Wis.

[73] Assignee: Plastics Enginerring Company, Sheboygan, Wis.

[*] Notice: The term of this patent shall not extend beyond the expiration date of Pat. No. 5,360,587.

[21] Appl. No.: 570,174

[22] Filed: Dec. 7, 1995

Related U.S. Application Data

[63] Continuation-in-part of Ser. No. 40,736, Mar. 31, 1993, Pat. No. 5,360,587, and Ser. No. 275,470, Jul. 14, 1994, abandoned.

[51] Int. Cl.$^6$ ............................................. C08J 5/10
[52] U.S. Cl. ..................... 523/149; 523/155; 524/6; 524/15; 524/445; 524/451; 524/494; 524/593; 428/364; 428/397; 428/401
[58] Field of Search ................ 523/149, 155; 524/6, 15, 445, 451, 494, 493; 428/364, 397, 401

[56] References Cited

U.S. PATENT DOCUMENTS

| | | | |
|---|---|---|---|
| 3,278,992 | 10/1966 | Strauss | 18/30 |
| 3,434,998 | 3/1969 | Aldrich et al. | 260/38 |
| 3,494,884 | 2/1970 | Kraft | 260/39 |
| 3,856,120 | 12/1974 | Kwolek et al. | 188/251 A |
| 3,917,555 | 11/1975 | Worscheck et al. | 260/31.4 R |
| 4,108,935 | 8/1978 | Moneghan | 264/68 |
| 4,130,537 | 12/1978 | Bohrer | 260/38 |
| 4,169,680 | 10/1979 | Littlefield | 366/139 |
| 4,197,352 | 4/1980 | Emmett et al. | 428/409 |
| 4,239,666 | 12/1980 | Jacko et al. | 260/17.5 |
| 4,268,657 | 5/1981 | Manzara | 528/155 |
| 4,320,823 | 3/1982 | Covaleski | 192/107 M |
| 4,321,221 | 3/1982 | Broutman | 264/23 |
| 4,349,595 | 9/1982 | Trainor et al. | 428/64 |
| 4,352,750 | 10/1982 | Eschen | 523/156 |
| 4,373,038 | 2/1983 | Moraw et al. | 523/156 |
| 4,384,054 | 5/1983 | Moraw et al. | 523/156 |
| 4,384,640 | 5/1983 | Trainor et al. | 192/107 M |
| 4,420,571 | 12/1983 | Blickensderfer et al. | 523/149 |
| 4,430,459 | 2/1984 | Akerberg et al. | 523/144 |
| 4,465,796 | 8/1984 | Leroy et al. | 523/153 |
| 4,468,486 | 8/1984 | Matsushima et al. | 523/146 |
| 4,548,617 | 10/1985 | Miyatani et al. | 51/293 |
| 4,563,386 | 1/1986 | Schwartz | 428/283 |
| 4,588,420 | 5/1986 | Charvat | 51/298 |
| 4,654,381 | 3/1987 | Kang et al. | 523/149 |
| 4,657,951 | 4/1987 | Takarada et al. | 523/153 |
| 4,831,067 | 5/1989 | Lemon et al. | 523/156 |
| 5,087,642 | 2/1992 | Seki et al. | 523/156 |
| 5,093,388 | 3/1992 | Siemon, Jr. et al. | 523/149 |
| 5,106,887 | 4/1992 | Horiguchi | 523/155 |
| 5,132,065 | 7/1992 | Christie | 264/122 |
| 5,268,398 | 12/1993 | Nakagawa et al. | 523/158 |

FOREIGN PATENT DOCUMENTS

| | | | |
|---|---|---|---|
| 1323979 | 11/1993 | Canada. | |
| 0324908A2 | 7/1989 | European Pat. Off.. | |
| 674781 | 7/1979 | Russian Federation | 264/118 |
| 2003088 | 3/1979 | United Kingdom. | |

*Primary Examiner*—Vasu Jagannathan
*Assistant Examiner*—John J. Guarriello
*Attorney, Agent, or Firm*—Quarles & Brady

[57] ABSTRACT

Densified particles of friction ingredients which include an uncured mix of friction ingredients with a thermosetting binder resin and an effective amount of a liquid coreactive with the resin which maintains the temperature during particle formation below the curing temperature of the resin can be used to make friction elements. Methods of forming friction elements from the particles and friction elements made from the particles also are described.

1 Claim, No Drawings

PREPARATION OF FRICTION ELEMENTS AND COMPOSITIONS THEREFOR

RELATED CASES

This application is a continuation-in-part of U.S. patent application Ser. No. 040,736, filed Mar. 31, 1993, now U.S. Pat. No. 5,360,587, and U.S. patent application Ser. No. 08/275,470, filed Jul. 14, 1994, now abandoned.

FIELD OF THE INVENTION

The present invention relates to new technology and insights which when practiced make possible more efficient and reliable manufacture of molded friction elements for automotive disc brakes, truck brakes, and other friction applications. More specifically, this invention relates to methods for the conversion of the loose, bulky and dusty mixtures as currently used for the manufacture of these friction elements into a more desirable state, namely: densified, cylindrical, rod-like particles possessing physical integrity together with sufficient surface area to enable practical preheating with pressurized gas at elevated temperature immediately prior to mold charging. This results in the production of molded friction elements of better quality and with greater efficiency than previously possible.

BACKGROUND OF THE INVENTION

Currently, molded friction elements as installed in vehicle brake systems are molded from a blended mixture of friction ingredients that are loose, bulky and dusty blends of resinous binders, reinforcing fibers, friction and wear controlling agents and inexpensive fillers. The mix is loose, bulky and dusty because the ingredients are in the form of fine powders, small and larger granules and fibers.

Powdered phenolic thermosetting resins are the binder of choice for a variety of braking applications. These heat resistant resins serve to bond the other ingredients into a solid, infusible mass when molded to final shape under the effects of heat and pressure. The reinforcing fibers are used to impart physical strength, heat stability and, to a limited extent, friction properties to the finished element. The friction and wear controlling agents are typically granules and powders of carbonaceous materials which impart and maintain the friction level and wear resistance. The inexpensive fillers are generally powdered minerals used to fill space and enhance some properties.

The formulas of the compositions used to make friction elements for specific applications are usually developed experimentally, confirmed by testing and, to a considerable extent, are held confidential. However, generally accepted volume ranges for the various friction ingredients in the compositions are as follows:

| Friction Ingredient | % Volume general | % Volume preferred |
|---|---|---|
| Binders | 10–35 | 20–30 |
| Reinforcing Fibers | 0–50 | 5–25 |
| Friction & Wear Controlling Agents | 20–80 | 35–45 |
| Fillers | 20–70 | 20–30 |

As a general rule, the binder content of a friction element is kept to a minimum. No more binder resin is used than is necessary to sufficiently bond the other ingredients into a solid, infusible mass when molded under heat and pressure. The minimum binder volume required will be determined by the types of friction ingredients used and, to a large extent, by the processes used to manufacture the final friction element.

Binder content is minimized because the organic resins used may be subjected to temperatures above their decomposition points. Partial decomposition of the binder at high service temperatures results in the formation of gases at the friction interface which lowers the element's braking effectiveness. This loss in effectiveness at elevated temperatures is referred to as brake "fade". The greater the element's binder content, the greater the effects of brake fade. Also, binders traditionally comprise a large percentage of the friction element's cost which provides an additional incentive to reduce its content.

The general process for the production of friction elements is described as follows: the desired amounts of the powdered binder resin, fibers, fillers and other ingredients are dry mixed. The bulk density of the resulting dry mix, which is a loose, bulky, dusty mass of powder, is less than half that of the molded element's final density. The mix must be carefully handled to avoid settling and separation of its powdered, granular, and fibrous ingredients.

It is current industry practice to first produce from the loose, bulky, dusty dry mix, prior to molding and at room temperature, a fragile preform in the near net shape of the final friction element. The preforms are made to the near net shape of the final element because, as a minimum amount of binder is used in friction elements to avoid brake fade, the dry mix has a very low propensity to flow and uniformly fill the mold cavity when heat and pressure is applied. The low resin content also results in weak and easily broken preforms which must be specially and carefully handled when transferred to a heated mold cavity for forming into final shape. The hot, pressurized molding step causes the resinous binder to melt, flow and coat the material's fillers. The thermosetting resin then crosslinks and cures to an infusible state. After ejection from the hot mold, the element may be cured further in an oven. When cool, the friction element is machined to final size, catalogued and packaged for market.

Preforming the dry mix prior to hot press molding helps eliminate some, but not all, of the unwanted air that can otherwise be trapped within the friction element. As the thermosetting resin crosslinks and cures during the molding step, gaseous byproducts such as water vapor and ammonia are produced. These vapors, along with the trapped air in the preform, will, if retained within the molding, result in unacceptable defects in the form of blisters, voids and delaminations in the final friction element.

In an effort to avoid such defects, it is current industry practice to frequently open the hot mold cavity during molding to allow the entrapped vapors to escape. The mold cavity is then closed and pressure reapplied so the fissures and delaminations created by the escaping vapors are sealed. This repeated opening and closing of the mold cavity is termed "breathing" or "bumping" the press. Press "bumping" cycles are continued until the binder has hardened so that the described defects will not result when the element is ejected from the mold.

Press bumping must be carefully and correctly timed so the resin has enough flow and reactivity to completely seal the voids and delaminations created by the escaping vapors. These delaminations and unsealed fissures will diminish the physical integrity of the element. Also, partially sealed fissures may delaminate when the element experiences rapid frictional heating during service. This problem has led to recalls of friction elements. Thus, press breathing, while employed to reduce defects, is time consuming, lowers productivity, and also causes product quality uncertainty.

The negative factors involved with the current methods of manufacturing friction elements can be circumvented by transforming the loose, bulky, dusty mix into a dense, regular geometry that lends itself to preheating prior to mold charging. As preheating starts the binder's curing reaction before the mixture is placed in the mold much less time is required to cure the mass of material to an infusible state. Thus, preheating the mixture is highly desirable because preheating enables more rapid molding cycles. In addition, the number of required press "bumps" may be reduced or even eliminated by preheating the charge of friction ingredients.

While high frequency radio waves, or oscillating magnetic fields, may be used to preheat specific friction material compositions, hot pressurized gas preheat systems appear to be the most economical and universally available method for preheating friction ingredients of all types. The inability to uniformly preheat conventional preforms of dry mixed friction ingredients with hot gas systems results from the mix's low density and subsequent low thermoconductivity. As heat transfer from the surface to the center is poor, simple convection or forced air ovens quickly heat and cure the binder on a preform's surface while its interior remains cool. Thus, no advantage is realized by hot gas preheating materials produced by the currently practiced dry mix preform method.

Preheating with hot, pressurized gas, requires that the friction material mix be densified in some way to improve its thermoconductivity. However, the densified particles must not be manufactured in a way that reduces the binder's plasticity to a point where the material will not flow and fuse during hot press molding. Also, as the goal is to manufacture friction elements as efficiently as possible, extra manufacturing steps such as filtering, drying, pressing, grinding or classification, which add cost and complexity to the process, should be avoided. In addition, the size and shape of the densified mix must be such that open channels are formed within a material charge to allow the hot gas to freely flow throughout all parts of the charge to assure uniform preheat.

In using hot gas preheat systems, it must be noted that while very hot air would quickly heat the friction material charge prior to molding, the preheat air must not precure the binder on the surface of a densified particle before adequately heating the interior. Therefore, while the initial thermal gradient from the particle's surface to its center must be relatively low, fast efficient preheat may be obtained by minimizing that distance. However, the particles must not be so small that they are carried away by the gas stream creating dust, or pack in a way to minimize the size of the open channels or cause large channels to form through which most of the preheat air preferentially flows.

A number of methods have been proposed for densifying a mix of friction ingredients. These methods include adding liquid solvents or cements, subjecting the mix to agglomeration techniques, or by extruding or pressing the mix followed by pulverization into a granular material. However, when put into practice these densification methods have been found to be ineffective, mainly because they add costly and complicated drying, recovery, pressing, grinding or screening steps to the manufacturing process. In addition, the densified particles obtained by these methods vary in size from inches in diameter down to small grains. The large particle size distribution results in dust generation and hinders uniform preheating with hot gas because the smaller particles quickly heat while the larger particles remain much cooler.

Thus, the problem lies in how to prepare the friction material mixtures in a way to make preheating with pressurized gas viable. We find that uncured friction material compositions formed into dense, cylindrical rod-like particles satisfies the requirements needed for efficient preheating with pressurized gas. The unique shape of the rod-like particles allows the diameter of the particle to be minimized while the length allows for the formation of a homogeneous matrix of air channels within a charge of particles. These rod-like particles are made to regular and uniform diameters on the order of $3/32$" to $1/4$". If the densified particles are not of the same approximate size, smaller particles will quickly heat and precure while larger particles remain unaffected resulting in a nonuniform preheat which is undesirable. The length of the rod-like particle may vary as length is more critical to particle integrity than to preheat uniformity. We have found lengths of $1/8$" to $3/4$" to be ideal for this purpose.

BRIEF SUMMARY OF THE INVENTION

It is an object of the present invention to provide a method of preheating particles of a friction material composition and molding those particles with compression and heating into friction elements.

It is an object of the invention to provide particles of friction materials which can be readily preheated and compression molded to form superior friction elements.

It is a further object to disclose novel mixtures of friction materials that can be used to form the desired particles.

We have discovered that dense, regular, cylindrical, rod-like particles of friction ingredients having diameters of from about $3/32$" (about 0.20 cm) to about $1/4$" (about 0.60 cm); lengths from about $1/8$" (about 0.30 cm) to about 1" (about 2.5 cm); and, densities greater than about 70% of the density of the final friction element can easily be preheated and compressed with heat to form superior friction elements.

The geometry of the rod-like particles allows fast preheating by minimizing the distance from the surface of the particles to its interior while being sturdy enough to secure all of the ingredients in place. Also, being of a regular rod-like shape, the particles naturally create and maintain large open channels or passageways so all of the particles have free access to the heated air for fast, efficient and uniform preheating with pressurized gas. When preheated, the particles maintain their free-flowing nature to allow for quick and easy charging of the hot press mold cavity eliminating any need to preform. The uniformity of the preheating of these particles allows for the reduction or elimination of press breathing and for faster molding cycles thereby improving productivity as previously described. In addition, by retaining the plasticity of the particles during densification, the flow of the friction material in the pressurized mold is dramatically improved.

We also have discovered that unexpectedly the combination of regular, rod-like particles and uniform preheating allows lower binder amounts to be used to produce uniform friction elements with unique and desirable friction properties accruing from the lower binder content.

It has heretofore been impractical to extrude friction ingredient mixtures or compositions under pressure into the form of our desired particles because the friction properties of the materials cause the temperature of the extrusion die and associated equipment to quickly reach the cure temperature of the resin binder. As the curing of the resin occurs, a slow buildup of cured friction material on the screws, barrels or extrusion die develops. This has a dramatic and undesirable effect on the maintenance of desired rheological properties and the continued production of useable material. When such buildup occurs the process must be aborted to prevent damage to the equipment or to avoid production of costly unusable material.

We have now discovered that friction ingredient mixtures or compositions in which a small amount of the solid, heat resistant resin binder is replaced with a temperature controlling additive, preferably a thermosetting liquid resin, permits particles of the desired geometry to be made.

The liquid resin apparently lowers the temperature necessary to achieve extrusion rheology of the mix thereby reducing the frictional heat created during extrusion. Thus, the rod-like particles can be produced without the build-up of cured friction material on the production equipment which frequently accompanies such extrusion processes when the compositions do not contain a temperature controlling additive. In addition, using the preferred additive, which is a coreactive, heat resistant liquid phenolic resin, does not introduce any new ingredients into the friction composition which could alter the frictional properties of the finished element during use. Preferably only enough liquid resin is used to maintain the processing temperature below the curing temperature of the solid resin binder. Excess amounts of the liquid resin can diminish the particle's integrity resulting in poor material yields. In addition, any residual liquid may require the addition of costly drying procedures. Furthermore, we have found that the same amount of liquid resin which provides the desired temperature control also enables the formation of particles of the desired density for preheating.

Preferably, the cylindrical rod-like particles contain no more than 15% by weight of material smaller than 60 mesh and they have diameters of ⅛" to 5/32" with lengths from ⅛" to 1". The cylindrical rod-like particle's size is determined by the diameter of the orifice used to extrude the mix while its length is controlled by knocking the nascent rod-like particle from the die's surface at a specified distance or after a certain time. These preferred particles allow for fast preheating by lowering the interior to surface distance while being sturdy enough to secure all of the ingredients in place. Large channels are formed between the cylindrical rod-like particles to allow for uniform preheating with hot air systems with little or no dust contamination to the surroundings. When preheated to a temperature between about 150° F. to about 375° F., the cylindrical rod-like particles maintain their free flowing nature to allow for quick and easy charging of the hot press mold cavity. The plasticity of the binders is retained during densification and, as a result of preheating and improved utilization of the binder, the flow of the material under pressure is dramatically improved. Thus lower overall binder amounts may be used to produce quality friction materials.

The preheated cylindrical rod-like particles can be formed into friction elements by introducing a predetermined amount of such particles into a mold for a friction element and compression molding them under heat and pressure at temperatures of about 250° F. to about 500° F. or more and under pressures of about at least 700 psi and up to or more than 6000 psi until the resin is infusible.

The uncured rod-like particles of the invention also provide for manufacturing friction elements from mixtures of different types of rod-like particles. These unique moldings exhibit synergistic properties which result from combining different friction materials where one or more of the materials are shaped into the uncured, rod-like particles of the invention prior to molding the friction element.

It will be further apparent to those skilled in the art from the description of the preferred embodiment and the examples that the above stated objects are obtained by the present invention and that the practice of the present invention has significant advantages over current commercial industry practices.

DESCRIPTION OF THE PREFERRED EMBODIMENTS OF THE INVENTION

The preferred friction ingredient compositions of the present invention have the following general formula:

|  | % Weight |
| --- | --- |
| Thermosetting Resin Binder | 5 to 30% |
| Temperature Controlling Agent | 1 to 50% |
| Reinforcing Fillers | 5 to 50% |
| Organic Fillers | 0 to 60% |
| Inorganic Fillers | 5 to 80% |

Many heat resistant thermosetting resins may be used as the binder in the practice of this invention. These resins include unmodified phenol-aldehyde resins, alkyl modified or inorganic modified phenol-aldehyde resins, epoxy resins, polyimide resins and many others as described throughout the patent literature.

For most applications, unmodified phenolic resins of the novolac type are preferred. The novolac resin is produced by controlling the reaction of phenol and formaldehyde in the presence of an acid catalyst. However, the amount of formaldehyde employed is maintained at a level which is insufficient to completely form a cured crosslinked structure. These resins are thermoplastic and at room temperature are solid and brittle. To complete the curing or crosslinking reaction, a hardening agent, hexamethylene-tetramine (hexa) is added. Hexa is a dry crystalline reaction product of ammonia and formaldehyde. When the mixture is heated in the mold, the hexa decomposes and forms crosslinking bridges of carbon and some nitrogen between the novolac molecules to cure the product into an infusible mass.

A variety of agents can be used to control the temperature of the mix as it is being formed into the rod-like particles. Representative agents are furfural, diphenyl oxide, furfuryl alcohol, polymers of hydroxymethylfuran, and water oil emulsions. However, the preferred agent is a liquid phenolic resin resole which is prepared by reacting phenol with formaldehyde in the present of an alkali or alkaline earth metal hydroxide or equivalent. One such resin is commercially available from Plastics Engineering Corporation under the trade name PLENCO 12194.

The reinforcing fillers are generally fibers such as asbestos, glass, ceramic, mineral, steel, brass, copper, or heat resistant organics such as aromatic polyamides or acrylic. The organic fillers may include particles from cashew nutshell oil resins, polymerized or partially polymerized, or elastomers in the form of virgin rubbers together with their vulcanizing and accelerating agents or polymerized rubber particles from scrap. The inorganic fillers include carbonaceous materials such as graphites and cokes, metallic powders from iron, brass, copper or zinc, or mineral fillers such as barium sulfate, kyanite, aluminum oxides, marble white, rottenstone, vermiculite, talcs and clays to name a few.

An especially preferred friction resistant compositions of an "organic" type friction material and a "semimetallic" type friction material have the following formulas:

|  | % weight | |
| --- | --- | --- |
|  | "organic" | "semimetallic" |
| Powdered Phenolic Novolac Resin | 5 to 15 | 5 to 10 |
| Liquid Phenolic Resole Resin | 1 to 5 | 2 to 10 |
| Heat Resistant Fibers | 0 to 25 | 20 to 40 |
| Nitrile Rubber | 3 to 10 | 1 to 5 |
| Ground Rubber Particles | 0 to 15 | 0 to 5 |
| Cashew Resin Particles | 0 to 10 | 1 to 5 |
| Graphites and Cokes | 0 to 15 | 5 to 20 |
| Metal Powders | 0 to 40 | 20 to 40 |
| Mineral Fillers | 10 to 50 | 0 to 25 |

Each of the ingredients mentioned above are readily available.

EXAMPLES

The invention is further illustrated by the following examples, wherein all parts are by weight, unless otherwise specified. Example 1 illustrates the preparation of a preferred friction resistant composition; Example 2 illustrates the preferred particle forming method; Example 14 illustrates the method of molding elements of the preferred composition and Example 15, 16, & 17 illustrate the method of improving the properties of the molded friction elements.

Example 1

Preparation of Friction Ingredient Composition

The following raw materials were blended in a mixer to form a dry mix of the preferred friction ingredient composition.

|  | % Weight |
| --- | --- |
| Powdered Phenolic Novolac Binder Resin | 14 |
| Liquid Phenolic Resole Resin | 1 |
| Ceramic Fiber | 22 |
| Mineral Fiber | 8 |
| Cashew Nutshell Resin | 6 |
| Nitrile Rubber with cure system | 6 |
| Ground Rubber Scrap (−20 mesh) | 6 |
| Brass Chips (−20 mesh) | 3.5 |
| Zinc Stearate (mold release) | 0.5 |
| Barium Sulfate | 30 |

Example 2

Preparation of Rod-Like Particles

The dry mix of ingredients obtained in Example 1 was fed into the compression zone of a roller-die compression extruder, such as a Sprout Waldron Pellet Mill. Pressure was applied and quality-rod like particles with a density near 80% their final molded density were obtained. The particles had regular diameters of ⅛" with lengths on the order of ⅛" to ½".

Example 3

The Preparation of Rod-Like Particles of Semimetallic Friction Ingredients Without Temperature Control Agent Into a Littleford Mixer was placed the following ingredients:

| Phenolic Novolac Binder Resin | 62 lbs |
| --- | --- |
| Nitrile Rubber | 17 lbs |
| Steel Fiber | 260 lbs |
| Barium Sulfate | 97 lbs |
| Aluminum Oxide | 7 lbs |
| Iron Powder | 260 lbs |
| Graphite | 140 lbs |

This mixture was blended until it was thoroughly mixed, then fed to the extruder of Example 2. After approximately ten minutes, the temperature of the particles exiting the unit exceeded 300° F. and the mill ceased functioning. The experiment was stopped to avoid damaging the unit. Attempts to mold the resulting particles resulted in moldings in which the particles would not flow together. The resulting molding crumbled in hand and exhibited no strength.

Example 4

The Properties of Rod-Like Particles of Semimetallic Friction Ingredients with Temperature Control Agent The blending procedure of Example 3 was repeated except that during the blending 3.3% by weight of a liquid phenolic resin resole (PLENCO 12194) was slowly added to the mixture. This resole is composed of approximately 75% by weight of resin in a water solution and an equal weight of the powdered novolac resin binder was omitted from the mix. When blending was completed, the mixture was passed through the extruder of Example 3, but this time the material was extruded into shape easily with no trace of curing. The temperature of the exiting particles never exceeded 230° F. and when molded filled the test mold completely. When molded as explained in Example 8 and 9, the rod-like particles showed excellent hole filling ability and excellent adhesion.

Example 5

Preservation of Compound Reactivity

Two friction materials, one generally referred to as a semimetallic and the other generally referred to as a non-asbestos organic material were prepared from the following formulas:

Semimetallic Friction Material Composition

| Ingredient | % Weight |
| --- | --- |
| Resin | 8.5 |
| PLENCO 12194 | 3.0 |
| Rubber | 1.5 |
| Cashew Particles | 1.2 |
| Graphite | 13.5 |
| Petroleum Coke | 5.3 |
| Barytes | 11.5 |
| Steel Fiber | 27.5 |
| Iron Powder | 28.0 |

Non-Asbestos Organic (NAO) Friction Material

| Ingredient | % Weight |
|---|---|
| Resin | 8.0 |
| PLENCO 12194 | 1.0 |
| Rubber | 5.0 |
| Mineral Fibers | 14.5 |
| Graphite | 5.5 |
| Petroleum Coke | 4.0 |
| Barytes | 28.0 |
| Copper Powder | 34.0 |

A charge of a metallic stearate equal to 0.5% of the total batch weight was added to the above formulas. In applications as a mold release agent, metallic stearates, such as calcium stearate and zinc stearate, have proven satisfactory. One such metallic stearate is commercially available from Plastics Engineering Company under the trade name PLENCO 10915. Metallic stearates have not been shown to affect the wear and friction performance of friction materials when used at this low level.

The formulas were thoroughly mixed in a Littleford blender and a sample of each dry mix was set aside. The remaining material was processed into rod-like particles according to the invention previously described.

The degree of reactivity of the Littleford dry mix and the processed rod-like particles is checked by extracting compound samples with tetrahydrofuran (THF) in an apparatus commonly referred to as a Soxhlet extractor. As uncured resins are extracted from the compound sample the greater the extractable amount, the more reactive the sample. The extractable percentage of the sample is defined by the following equation:

Percent Extractable=100×(Wt. Before−Wt. After)/Wt. Before

Wt. Before=weight of sample before extraction

Wt. After=weight of sample after extraction

The dry mix and processed rod-like particles of the non-asbestos organic and semimetallic materials were tested for percent extractable by the method described. The results are shown in the following figures:

|  | Dry Mix | Rod-Like Particles |
|---|---|---|
| Non-asbestos Organic % THF Extractable | 10.2 | 10.2 |
| Semimetallic % THF Extractable | 10.0 | 10.4 |

Materials made without adequate temperature control agent have shown dramatic reductions in percent extractables and thus a lowering of reactivity. Non-asbestos organic and semimetallic formulas identical to the ones described above were processed with water in place of the resole. As the following extraction results show, omitting the resole resulted in particles of lower reactivity. In the case of the semimetallic formula, the reactivity is considerably reduced.

|  | % THF Extractable | |
|---|---|---|
|  | Dry Mix | Rod-Like Particles |
| NAO |  |  |
| With Resole | 23.4 | 23.4 |
| Without Resole | 23.2 | 22.5 |
| Semimetallic |  |  |
| With Resole | 7.0 | 6.1 |
| Without Resole | 6.9 | 3.6 |

From these results, it may be concluded that the particle forming process does not significantly effect the reactivity of the friction compounds when the resole is used.

Example 6

Improved Preform Shape Retention

Preforms in the shape of disc brake pads suitable for a Ford F-250 pickup truck, (FMSI #D-120), 0.700" tall with a surface area of 12.8 in$^2$ were formed from both the Littleford mix sample and the rod-like particles of the non-asbestos organic and semimetallic materials described in Example 5.

The preforms were formed under 3,000 psi surface pressure and pressed for 10 seconds. The thickness of the preforms was measured immediately after removal from the mold, after being left to stand for three hours, and again after three days.

The average percent thickness increase of the preforms was calculated. The results are shown in the following tables.

| D-120 Preform % Thickness Increase | | | | |
|---|---|---|---|---|
|  | Dry Mix | | Rod-Like Particles | |
|  | Average | Std. Dev. | Average | Std. Dev. |
| NAO Formula |  |  |  |  |
| After 3 hours | 6.4 | 2.1 | 1.4 | .5 |
| After 3 days | 9.0 | 3.0 | 2.3 | .2 |
| Semimetallic Formula |  |  |  |  |
| After 3 hours | 3.3 | 1.2 | 2.1 | .3 |
| After 3 days | 4.5 | 2.0 | 3.4 | .4 |

Std. Dev. = Standard Deviation (N-1)

Thus, friction ingredients formed into rod-like particles by the above invention demonstrate excellent preform shape retention.

Example 7

Improved Break Strength of Preforms Formed from Rod-Like Particles

Preforms for a Ford Escort passenger car disc brake pad (FMSI #D-257) were made from the dry mix sample and from rod-like particles of the semimetallic and non-asbestos organic friction materials described in Example 5.

The 1" thick preforms were made by pressing the materials under 2,500 psi for five seconds in a steel preform mold. The three point breaking strength of the preforms was then measured using a crosshead speed of 0.1 in/min and a span of 2½". The results from the tests are shown in the following figure:

|  | Semimetallic | | NAO | |
|---|---|---|---|---|
| Material Form | Dry Mix | Rod-Like Particles | Dry Mix | Rod-Like Particles |
| Breaking Load pounds force | 2.9 | 5.7 | 1.0 | 17.7 |
| Standard Deviation (N-1) | 1.3 | 0.5 | 1.0 | 2.2 |

Preforms formed from an equal mixture of the NAO and semimetallic materials demonstrated breaking strengths as shown below.

| | One Part NAO One Part Semimetallic Mixture | |
|---|---|---|
| Form | Dry Mix | Rod-Like Particles |
| Breaking Load pounds force | 2.0 | 12.7 |
| Standard Deviation (N-1) | 1.3 | 1.6 |

Example 8

Improved Rheology of Materials Processed by the Invention

The formulas described in Example 5 were thoroughly mixed in a Littleford blender and a sample of each dry mix was set aside. The remaining material was processed into rod-like particles according to the invention previously described.

Test cups, similar to a drinking cup configuration, 5" tall, 2½" diameter at the base and 3" diameter at the lip were molded from cylindrical preforms 1⅞" in diameter and 1½" to 2½" high formed from the dry mix sample and the rod-like particles of the semimetallic and NAO materials above. In this cup flow test, the minimum pressure needed to completely fill the mold cavity using the rod-like particles is recorded. Preforms made from the conventional dry mix of each material were then molded under identical conditions. The test moldings are then compared between the dry mix and rod-like particle forms of the materials. The results were as follows:

| | Dry Mix | Rod-Like Particles |
|---|---|---|
| NAO Formula | | |
| Molding Pressure psi | 500 | 500 |
| Time to mold closure sec. | did not close | 53 |
| Final cup height max./ave. in | 4.9/4.3 | 5/5 |
| Semimetallic Formula | | |
| Molding Pressure psi | 2000 | 2000 |
| Time to mold closure sec. | did not close | 21 |

-continued

| | Dry Mix | Rod-Like Particles |
|---|---|---|
| Final cup height max./ave. in | 4.1/3.7 | 5/5 |

Each composition in the form of rod-like particles produced complete moldings whereas the Littleford dry mixes did not completely fill the mold cavity under identical conditions.

Example 9

Improved Flow of Rod-Like Particles

The following raw materials were thoroughly mixed in a Littleford blender.

| | Material (% Weight) | |
|---|---|---|
| Ingredient | A | B |
| Powdered Phenolic Novolac Binder | 8.4 | 6.1 |
| Liquid Resole (PLENCO 12194) | 3.0 | 3.0 |
| Nitrile Rubber | 1.5 | 1.5 |
| Cashew Particles | 1.2 | 1.3 |
| Graphite | 13.5 | 13.5 |
| Petroleum Coke | 5.2 | 5.2 |
| Barium Sulfate | 11.2 | 11.9 |
| Steel Fibers | 27.5 | 28.0 |
| Iron Powder | 28.0 | 29.0 |
| Zinc Stearate | 0.5 | 0.5 |

A sample of each was set aside and the rest of the material was processed into rod-like particles according to the invention described above.

Circular preforms 1" thick and 1⅞" in diameter were made from the dry mix of each formula and from the rod-like particles of each formula. These preforms were compression molded, without preheating, under 2000 psi directly on top of a heated steel disk, 2" in diameter and 0.190" thick. This disc back plate had sixteen ¼" diameter holes drilled through it. These so called integrally molded (I.M.) holes were equally spaced in a 4 by 4 arrangement. The force required to shear the material from the circular back plate was measured according to the parameters recommended in SAE procedure J840. The results from the molding operation and shear strength testing are shown in the following table.

| | Material | | | |
|---|---|---|---|---|
| | A | | B | |
| | dry mix | rod-like particles | dry mix | rod-like particles |
| % of back plate holes filled | <80 | 100 | <10 | >90 |
| Average shear force, lbs. force | 2303 | 2496 | 1005 | 1772 |
| Standard Deviation (N-1) | 303 | 318 | 232 | 542 |
| Shear failure mode | material | material | pull out | material |

The dry mix and rod-like particles of material A do not significantly differ in terms of shear strength however, the percentage of back plate holes filled is greatly improved by using the rod-like particles. When the resin amount is lowered to 22% volume the improvement in hole fill and shear strength afforded by the invention is dramatic. Previously, improving the flow of friction materials meant increasing the resin amount in the formula or modifying the molding process. This invention now offers a new and novel approach to improving the flow of these resin starved types of materials.

Example 10

Demonstration of Free Flowing Nature of Rod-Like Particles

The dry mix samples from the materials described in Example 5 were charged into the stationary hopper apparatus of an automatic, volumetric, hydraulic preform machine. When the machine was operated, no preforms were obtained as the bulky, dusty dry mix constantly bridged and was unable to consistently flow into the preform cavity.

When rod-like particles of the same dimensions as Example 2 and materials of Example 5 were charged into the hopper apparatus, the particles gravity fed into the preform cavity such that the machine produced regular, cylindrical preforms throughout the test run. Preforms of 350 grams were obtained with a variance of less than 10 grams using this volumetric loading procedure.

Example 11

Transfer Molding of Dry Littleford Mix

The dry mix of Example 1 before formation into particles is weighed into 150 gram charges and placed in a pressure preformer operating at 1500 psi where it is pressed to form a cylinder approximately 2 inches high by approximately 2" in diameter. Several preforms of this size were made and placed in the transfer cylinder of a standard ASTM D1896 Transfer Mold maintained at 330° F. used on a 100 ton molding press. The press was closed and 2400 psi applied to the transfer cylinder. After 5 minutes the transfer pressure was relaxed and the press opened. There was observed only slight flow into the gates and runner and no suitable parts were produced. When the dry mix is placed into the mold without preheating, nearly identical results obtained. This demonstrates the lack of flow of the dry mix either preformed or as produced.

Example 12

Transfer Molding of Rod-Like Particles

Particles of the invention obtained from Example 2 were preheated by tumbling in a hot air stream to about 230° F. in 2 minutes. The particles were easily charged to a transfer mold for flexural strength bars. The mold was heated to 330° F. and a pressure of 2400 psi was applied for 3 minutes. The bars obtained were compared to bars made without preheating. The bars that were made from rod-like particles which had not been preheated did not produce as good appearing flex bars. The unheated rod-like particles did flow enough to fill the cavity; however, there was very little flash on the molded bars as compared to those obtained when the particles were preheated. In addition, some blistering occurred on a few of the bars formed from the non-preheated particles. Moreover, the high quality surfaces realized on the bars made from the preheated particles were not reproduced when the particles were not preheated. A very smooth surface covered all but ¼" to ½" of the flex bar obtained when the particles were preheated. When the particles were not preheated, the smooth surface only covered 1-2" of the 5" bar. The preheating also improved the production rate, appearances and physical properties of the molded part. This example shows the dramatic effect of the rod-like particle formation process on rheological flow properties.

Example 13

Improved Friction Stability and Fade Resistance of Semimetallic Friction Materials Made by the Invention The semimetallic formula described in Example 5 was blended in a Littleford mixer, processed into dustless rod-like particles according to the invention described in Example 2.

Disc pads suitable for the front disc brakes for 1990 Ford Escort (FMSI #D-257) prepared according to the invention and were subjected to an inertia dynomometer test procedure. The dynomometer test measures the brake line pressures required to stop a rotating mass according to the schedule shown below:

A04D Dynomometer Test Procedure

Brake Type: Ford Escort Disc
Actual Wheel Loadings (lbs.): 1013
Rolling Radius (in.): 10.57
Actual inertia (slug ft. ^2): 24.305

| Cycle | Number of Stops | Braking Speed (mph) | Decel (fpsps) | Initial Rotor Temp. (°F.) |
|---|---|---|---|---|
| Instrument Check Stops | 10 | 30 | 10 | 250 |
| Pre-Burnish | 4 | 30 | 5, 10, 20, 30 | 250 |
| Effectiveness Stops | 4 | 60 | 5, 10, 20, 30 | 250 |
| Burnish Stops | 100 | 30 | 10 | 300 |
|  | 100 | 40 | 12 | 350 |
| Post Burnish | 4 | 30 | 5, 10, 20, 30 | 250 |
| Effectiveness Stops | 4 | 60 | 5, 10, 20, 30 | 250 |
| Baseline Stops | 3 | 30 | 10 | 250 |
| Fade Stops | 12 | 60 | 15 | 250–700 |
| Recovery Stops | 5 | 30 | 10 | — |
| Post Fade/Recovery | 4 | 30 | 5, 10, 20, 30 | 250 |
| Effectiveness Stops | 4 | 60 | 5, 10, 20, 30 | 250 |
| Pad Inspection | — | — | — | — |
| 600° F. Wear Stops | 75 | 60 | 12 | 600 |
| Pad Inspection | — | — | — | — |
| 800° F. Wear Stops | 50 | 60 | 12 | 800 |
| Post Wear Tests | 4 | 30 | 5, 10, 20, 30 | 250 |
| Effectiveness Stops | 4 | 60 | 5, 10, 20, 30 | 250 |

The results from the fade and recovery portions of the test on brake pads made in accordance with the invention are shown in Table 1 below.

TABLE 1

| | Baseline | | Fade | | Recovery | |
|---|---|---|---|---|---|---|
| Stop No. | Initial Rotor Temp. | Line Pressure psi | Initial Rotor Temp. °F. | Line Pressure psi | Initial Rotor Temp. | Line Pressure psi. |
| 1 | 99 | 320–428 | 177 | 514–648 | 791 | 300–424 |
| 2 | 132 | 360–490 | 296 | 485–642 | 521 | 320–504 |
| 3 | 157 | 360–487 | 347 | 484–675 | 372 | 218–377 |
| 4 | | | 398 | 497–683 | 282 | 208–304 |

TABLE 1-continued

| | Baseline | | Fade | | Recovery | |
|---|---|---|---|---|---|---|
| Stop No. | Initial Rotor Temp. | Line Pressure psi | Initial Rotor Temp. °F. | Line Pressure psi | Initial Rotor Temp. | Line Pressure psi. |
| 5 | | | 449 | 563–734 | 229 | 203–385 |
| 6 | | | 499 | 608–770 | | |
| 7 | | | 549 | 593–747 | | |
| 8 | | | 597 | 605–750 | | |
| 9 | | | 647 | 577–753 | | |
| 10 | | | 694 | 574–761 | | |

Brake pads molded from the conventional dry mix form of the friction material were similarly tested according to the A04D inertia dynomometer schedule. The results from the fade portion of the test are shown in Table 2 below.

TABLE 2

| | Baseline | | Fade | | Recovery Inital | |
|---|---|---|---|---|---|---|
| Stop No. | Initial Rotor Temp. | Line Pressure psi | Initial Rotor Temp. °F. | Line Pressure psi | Rotor Temp. °F. | Line Pressure psi. |
| 1 | 238 | 285–499 | 249 | 332–652 | 931 | 471–739 |
| 2 | 250 | 275–499 | 301 | 337–579 | 606 | 372–472 |
| 3 | 250 | 283–441 | 350 | 345–619 | 495 | 244–472 |
| 4 | | | 398 | 383–583 | 432 | 185–353 |
| 5 | | | 448 | 438–651 | 390 | 171–344 |
| 6 | | | 499 | 527–698 | | |
| 7 | | | 549 | 634–719 | | |
| 8 | | | 558 | 589–788 | | |
| 9 | | | 595 | 605–822 | | |
| 10 | | | 655 | 581–910 | | |

From these results it may be concluded that semi-metallic friction materials molded from the rod-like particles possess improved frictional stability and fade resistance in comparison to friction materials molded from a dry mix of the same composition.

Example 14

Improved Molding of Non-Asbestos Organic Friction Materials Made by the Invention Cam and Anchor friction elements for class 8 truck air brake systems (FMSI #4515) were prepared in the conventional manner from the following ingredients:

| | % weight | |
|---|---|---|
| material | Ac | Bc |
| Powdered Phenolic Novolac Binder | 17 | 13 |
| Nitrile Rubber & Cure Agents | 3 | 4 |
| Rubber Scrap (−20 mesh) | 12 | 5 |
| Fiber Glass | 8.6 | — |
| Mineral Fibers | — | 23 |
| Graphite | 7.3 | 7 |
| Petroleum Coke | 4 | 3 |
| Copper Powder | — | 12 |
| Barium Sulfate | 30 | 26 |
| Aluminum Oxide | 1.5 | 1.2 |
| Marble White | 2.6 | — |
| Vermiculite | 11 | 2.8 |

-continued

| | % weight | |
|---|---|---|
| material | Ac | Bc |
| Acrylic Pulp (processing aid) | 2.5 | 2.5 |
| Zinc Stearate (mold release) | 0.5 | 0.5 |

The above ingredients were thoroughly mixed in a Littleford blender. Preforms in the near net shape of the final element were formed under 2000 psi for 10 seconds at room temperature. It is necessary to use pulps of organic polymers as processing aids to obtain quality preforms of the dry mix. The preforms were then placed into a mold cavity preheated to 300° F. and molded under 2000 psi for 15 minutes.

To obtain blister free moldings from the dry mix preforms, the press was opened and closed many times during the molding process. In this case, the mold was opened after 1 minute, and closed after 15 seconds. After 30 seconds the mold was reopened for 15 seconds and closed after another 30 seconds. The mold was breathed in this way through 8 minutes of molding to allow enough vapors to escape so a solid, infusible element was ejected from the mold after 15 minutes.

Cam and anchor 4515 friction elements were prepared from identical formulas of Ac and Bc above that had been processed into rod-like particles according to the invention of Example 2. The only difference in the formulas being that a portion of the powdered novolac binder was replaced by PLENCO 12194, and, as no preforming in required, the organic pulp processing aid is omitted from the formula. The rod-like particles of the invention were preheated to about 220° F. with 280° F., 60 cfm air in 4 minutes. The preheated particles were easily charged into the mold cavity and pressure was applied. Due to the uniform preheat, press breathing was not required and solid infusible elements were ejected from the mold in 5 minutes.

Example 15

Improved Wear Resistance of Non-asbestos Organic Friction Materials Made by the Invention Disc brake pads suitable for a Ford F-250 pickup truck (FMSI #D-120) were prepared from a sample of the Littleford dry mix and the rod-like particle form of the NAO formula described in Example 5. The friction materials were tested according to the A04D inertia dynomometer schedule described in Example 13.

Frictional properties between the two material forms proved to be nearly identical. The only noticeable difference in frictional performance between the two material forms came during the 800° F. wear cycle when the brake pads made from rod-like particles demonstrated a 20% higher coefficient of friction than the brake pads made from the composition's dry mix. The friction material's wear resistance was dramatically improved as the following table indicates:

Total Brake Pad Wear After A04D Dynomometer Test Procedure

| NAO Form. | Inches Lost | Grams Lost |
|---|---|---|
| Dry Mix | .171 | 91.5 |
| Rod-Like particles | .134 | 78.2 |

Example 16

Improved Method for the Dispersal of Friction and Wear Controlling Particles Disc brake pads were molded by combining various proportions of the rod-like particles of the non-asbestos organic and semimetallic materials described in Example 5.

The two different friction materials were combined in the following weight percents:

| Trial # | % NAO | % Semimetallic |
|---|---|---|
| 1 | 100 | 0 |
| 2 | 70 | 30 |
| 3 | 50 | 50 |
| 4 | 30 | 70 |
| 5 | 0 | 100 |

Physical property tests on the 0, 50, and 100 percent semimetallic materials gave the following results:

| Physical Property | % Semimetallic Material | | |
|---|---|---|---|
|  | 0 | 50 | 100 |
| Specific Gravity | 2.89 | 3.05 | 3.16 |
| Flexural @ 25° C. psi | 4580 | 4445 | 3987 |
| Flexural @ 150° C. psi | 2626 | 2959 | 3251 |
| Modulus @ 25° C. psi | 1.2E6 | 1.1E6 | 9.3E5 |
| Modulus @ 150° C. psi | 6.8E5 | 6.5E5 | 7.8E5 |
| Shear Strength @ 25° C. psi | 6823 | 6125 | 5073 |

A friction material test machine commonly referred to as a CHASE machine, was used to evaluate the friction and wear properties of these materials. The machine was operated in the constant output or constant friction force mode. The sample was applied for 20 seconds and lifted for 10 seconds for 150 applications at 450° F. with a drum speed of 420 rpm. The samples were required to produce 100 pounds of friction force during the application. The following table lists the results from this test.

| 450° Wear Test Property | % Semimetallic | | | | |
|---|---|---|---|---|---|
|  | 0 | 30 | 50 | 70 | 100 |
| Friction Coefficient | .44 | .31 | .38 | .29 | .30 |
| Thickness loss | .021 | .006 | .013 | .007 | .006 |
| % Thickness Loss / % Weight Loss | 1.20 | 1.01 | 1.02 | 1.14 | 0.88 |

Another CHASE test protocol referred to as the GM R60 test was used to study the high speed, high temperature characteristics of these materials. While the 100 percent non-asbestos organic material faded dramatically during the high speed, high temperature fades of the test, each of the above samples made with semimetallic rod-like particles demonstrated consistent friction levels throughout the test. The wear resistance was also improved with the use of the semimetallic materials.

D-120 brake pads were prepared from the NAO's dry mix, and from rod-like particles formed from the dry mix. Similar brake pads were made from a 70% NAO, 30% semi-metallic blend of their dry mixes, and from a 70% NAO, 30% semimetallic blend of the rod-like particles. The brake pads were subjected to the A04D dynomometer test procedure previously described. The results from the high temperature portions of the test are shown in the following table.

| Fade Stop No. | Initial Rotor Temp. (Approx.) | Brake Line Pressure | | | |
|---|---|---|---|---|---|
| | | NAO | | 70% NAO:30% Semimetallic | |
| | | NAO Dry Mix | Rod-Like Particles | Dry Mix | Rod-Like Particles |
| 6 | 500 | 545–968 | 599–1056 | 723–966 | 656–946 |
| 7 | 550 | 598–1063 | 619–1162 | 741–1034 | 659–1024 |
| 8 | 600 | 605–1170 | 603–1239 | 774–1097 | 793–1081 |
| 9 | 650 | 695–1248 | 690–1282 | 839–1139 | 774–1123 |
| 10 | 700 | 736–1237 | 697–1228 | 832–1131 | 784–1131 |
| 11 | 750 | 733–1230 | 704–1136 | 817–1115 | 750–1132 |
| 12 | 800 | 379–799 | 420–725 | 443–703 | 428–677 |
| Recovery stop #1 | 750 | 379–799 | 420–725 | 443–703 | 428–677 |
| Average inches lost during Fade cycle | | .034 | .033 | .035 | .035 |
| Average inches lost during 800° wear cycle | | .077 | .077 | .106 | .022 |

From these results it may be concluded that the high temperature performance of friction materials may be improved by the use of semimetallic materials in the form of rod-like particles. Improvements may be realized when the semimetallic is added at only 30% by weight.

Example 17

Improved Performance Offered by the Invention

The ingredients listed below were charged into a Littleford blender and mixed for 20 minutes.

| Ingredient | % by Weight |
|---|---|
| Powdered Phenolic Novolac Binder | 14.0 |
| Liquid Resole (PLENCO 12194) | 2.0 |
| Nitrile Rubber | 3.0 |
| Rubber Cure System | 0.1 |
| Glass Fiber | 13.5 |
| Graphite | 8.3 |
| Petroleum Coke | 4.5 |
| Ground Scrap Rubber | 12.1 |
| BaSO4 | 29.5 |
| Kyanite | 1.5 |
| Calcium Carbonate | 2.5 |
| Vermiculite | 9.0 |
| Zinc Stearate | 0.5 |

A sample of the dry mix was set aside and the remaining material converted into rod-like particles according to the invention as described in Example 2. D-120 brake pads were molded from the combinations shown in the following table.

| Material No. | Above NAO | Semimetallic from Example 5 |
|---|---|---|
| 1 | 100% dry mix | 0% |
| 2 | 50% dry mix | 50% dry mix |
| 3 | 50% rod-like particles | 50% rod-like particles |

The pads were prepared under identical conditions and subjected to the A04D dynomometer test procedure previously described.

Results from the dynomometer tests are shown in the following table:

| Fade Stop No. | Initial Rotor Temp. (Approx. F.) | Brake Line Pressure Material | | |
|---|---|---|---|---|
| | | 1 | 2 | 3 |
| 6 | 500 | 690–898 | 74–1061 | 697–1002 |
| 7 | 550 | 688–974 | 817–1183 | 870–1118 |
| 8 | 600 | 750–1125 | 880–1320 | 902–1201 |
| 9 | 650 | 784–1214 | 968–1394 | 897–1228 |
| 10 | 700 | 1007–1378 | 1081–1545 | 941–1219 |
| 11 | 750 | 1053–1549 | 1023–1631 | 960–1136 |
| 12 | 800 | 1054–1599 | 1023–1631 | 960–1136 |

-continued

| Fade Stop No. | Initial Rotor Temp. (Approx. F.) | Brake Line Pressure Material | | |
|---|---|---|---|---|
| | | 1 | 2 | 3 |
| Recovery Stop No. 1 | 750 | 919–1338 | 658–1035 | 551–821 |
| Total Pad Thickness Loss in | | 0.123 | 0.142 | 0.108 |

From these results it may be concluded that the high temperature performance of NAO friction materials may be improved with the use of rod-like particles of semimetallic friction materials. Simply blending portions of NAO and semimetallic dry mixes does not improve performance as well as blending rod-like particles.

The densified, rod-like particles of the present invention make it possible to prepare friction elements by transfer molding. The transfer molding method comprises placing a charge of preheated or cold rod-like particles or preforms of said particles into the transfer cylinder of a transfer molding press, closing the press, heating the charge to a plastic state, forcing the charge through a plurality of channels into a mold cavity of the desired friction element shape, curing the material in the cavity and then removing the thus formed friction element from the cavity.

In some instances, such as when the preheating of the particles is not required, it may be desirable to grind the rod-like particles into a coarse, substantially dustless, mixture of densified particles. Such particles may permit some producers of friction elements to more readily use their existing equipment for handling the friction material containing composition and charging the molds.

It will be apparent to those skilled in the art that a number of modifications and changes can be made without departing from the spirit and scope of the present invention.

We claim:

1. Densified cylindrical particles having a diameter of about 3/32" to about 1/4" and a length of about 1/8" to about 1", said particles being formed by the extrusion of a mixture comprising by weight:

a) about 5% to about 30% of a powdered heat curable thermosetting binder resin;

b) about 5 to 50% of reinforcing filler;

c) about 0 to about 60% of organic fillers;

d) about 5 to about 80% of inorganic fillers, and e) about 1 to about 10% of a coreactive liquid member, said member being selected from the group consisting of a liquid phenolic resole resin, furfuryl, diphenyl oxide, furfuryl alcohol, a polymer of hydroxy methyl furan and a water-oil emulsion.

* * * * *

UNITED STATES PATENT AND TRADEMARK OFFICE
CERTIFICATE OF CORRECTION

PATENT NO. : 5,714,525
DATED : February 3, 1998
INVENTOR(S) : Ralph T. Brotz et al.

It is certified that error appears in the above-indentified patent and that said Letters Patent is hereby corrected as shown below:

Column 18, line 58

In table entitled       Change line 12 to read:
"Brake Line Pressure"   12   815-1231   745-1141   805-1107   830-1139

Column 19, line 56

In table entitled       Change line 11 to read:
"Brake Line Pressure"   11   750   1053-1549   1045-1634   902-1178

Signed and Sealed this

Twenty-fifth Day of August, 1998

Attest:

Attesting Officer

BRUCE LEHMAN

Commissioner of Patents and Trademarks